INVENTOR.
ISADORE K. DORTORT

Aug. 2, 1960     I. K. DORTORT     2,947,932
OVERLAP REGULATOR
Filed Feb. 11, 1958     3 Sheets-Sheet 2
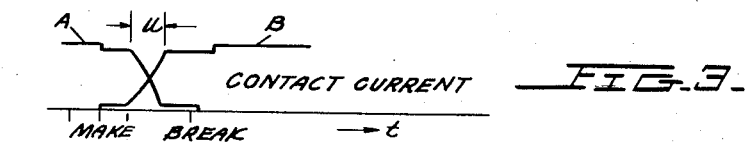
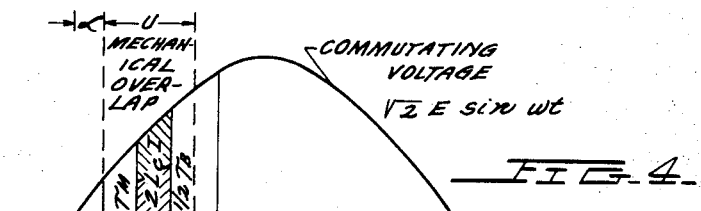
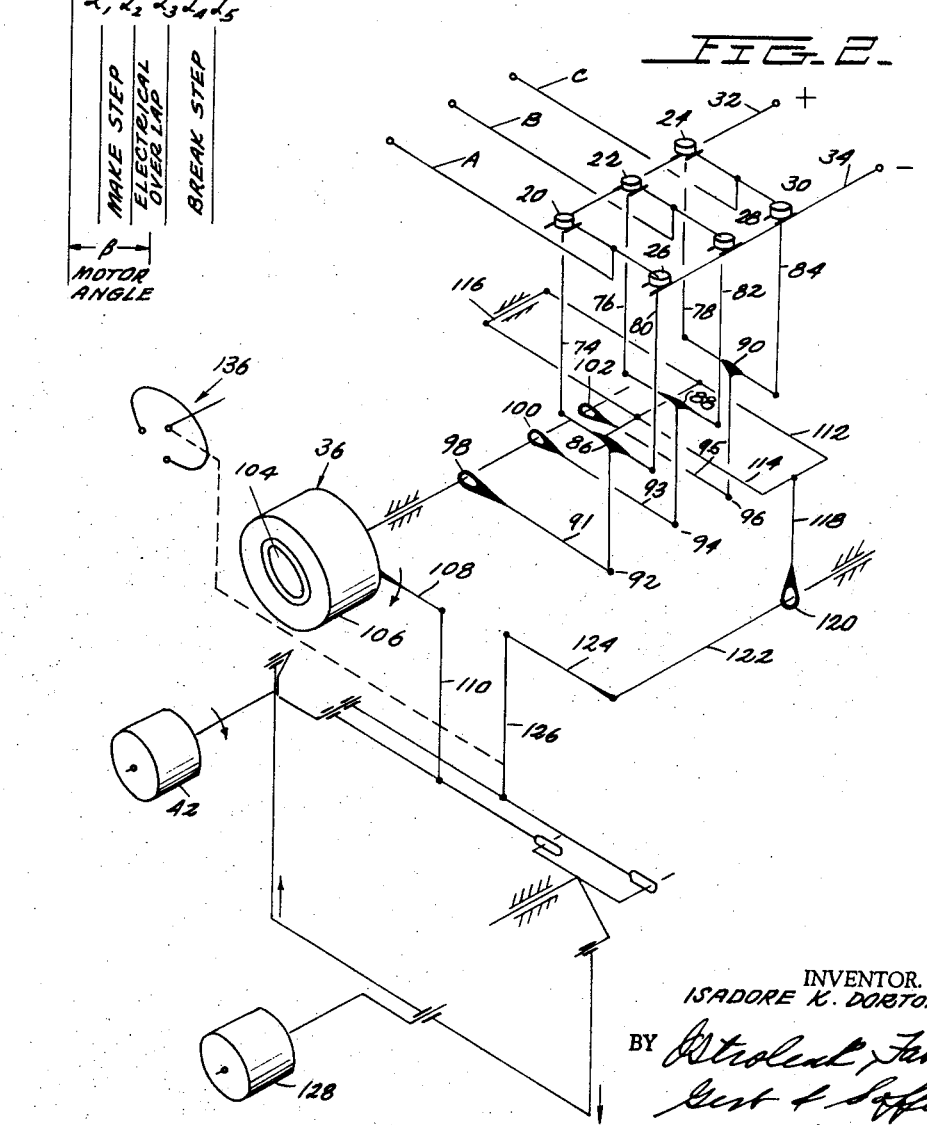
INVENTOR.
ISADORE K. DORTORT
BY
ATTORNEYS Aug. 2, 1960
I. K. DORTORT
2,947,932
OVERLAP REGULATOR
Filed Feb. 11, 1958
3 Sheets-Sheet 3
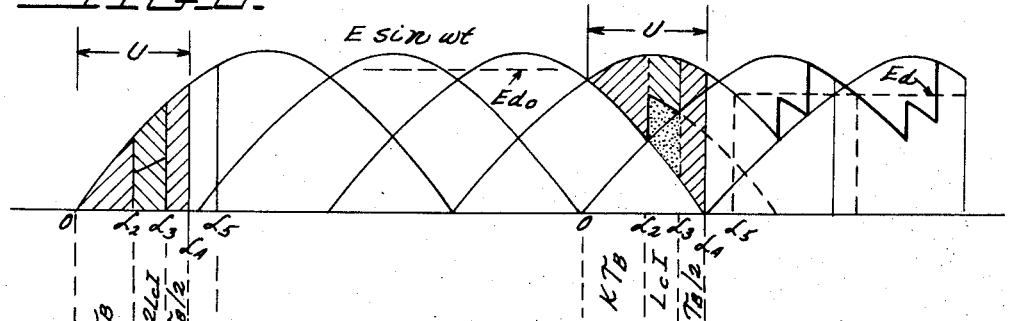
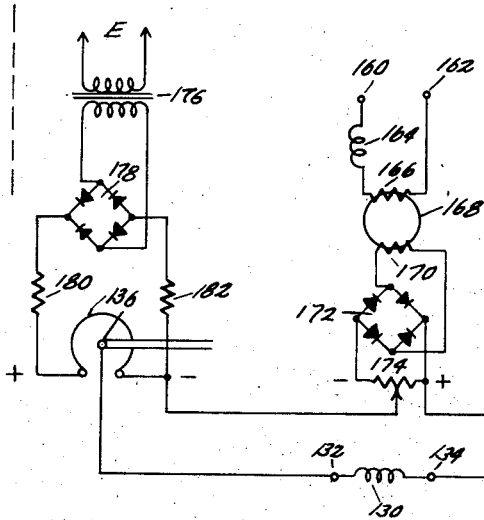
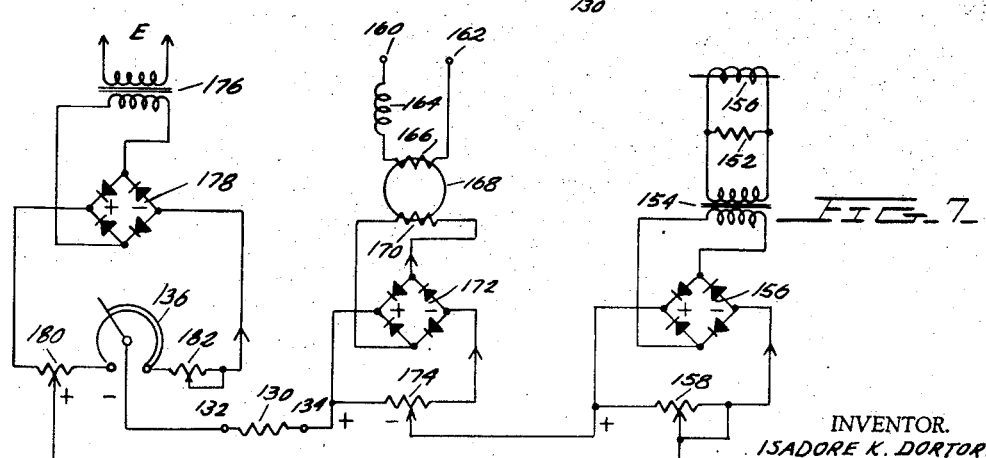
INVENTOR.
ISADORE K. DORTORT
BY
ATTORNEYS United States Patent Office 2,947,932
Patented Aug. 2, 1960

2,947,932
OVERLAP REGULATOR

Isadore K. Dortort, Philadelphia, Pa., assignor to I-T-E Circuit Breaker Company, Philadelphia, Pa., a corporation of Pennsylvania Filed Feb. 11, 1958, Ser. No. 714,522

12 Claims. (Cl. 321—48)

My invention relates to an overlap regulator for mechanical rectifiers, and is more specifically directed to an overlap regulator which operates independently of signals derived from the electrical contact devices of the rectifier.

Overlap regulators are well known in the art, and have been described in U.S. Patent No. 2,759,141 to Diebold. In a mechanical rectifier, an electrical contact is driven in synchronism with the frequency of the input A.-C. source to synchronously connect and disconnect the A.-C. source from the D.-C. load so that when the potential of the A.-C. source is positive, it is connected to the D.-C. load, and when it becomes negative it is disconnected from the D.-C. load.

In order to decrease the duty on the contact, a commutating reactor is connected in series therewith so as to provide a protective step within which the contact may operate. Thus, when the contact is to be disengaged, the commutating reactor will operate to maintain the current at a substantially zero value for a predetermined time. The point at which the current through the contact decreases to its break step is dependent upon many factors such as the input A.-C. voltage, the load current, the output D.-C. voltage, and the nature of the D.-C. load. The overlap regulator controls the point at which the contact breaks so that the break will occur at the time the current step is provided.

Thus, when the position of the break step is changed because of some altered electrical condition such as a change in load or change in secondary voltage, the overlap regulator will alter the position at which the contact breaks accordingly.

Furthermore, in view of the inherent variations in the mechanical and electrical system, it is preferable to open the contact at some centrally located portion of this current step so as to allow for variations which would slightly alter the actual position at which the mechanical break or current step will occur so that the overlap regulator positions the contact break point at the middle of the step.

In the past, overlap regulators have always included at least one circuit which includes the rectifier contacts so as to have some indication of the actual position at which the contacts separate. This circuit, however, imposes extra interrupting duties on the contact, since when the contact opens, it must open not only the voltage of the rectifier circuit, but also it must open the voltage and current of the overlap measuring circuit.

The principle of my invention is to provide a novel overlap regulator system which operates independently of circuitry which includes the rectifying contact as an element.

More specifically, I provide an electrical circuit which is synthesized to produce an electrical output to the contact break position adjusting means, in accordance with the theoretical overlap position, as determined by the various circuit parameters of the rectifier system.

My invention is particularly applicable to the hydraulic regulator set forth in above noted U.S. Patent No. 2,759,141. In my novel circuit, the required input voltage to the regulator is predetermined from a constant voltage, the load current, the input secondary voltage, and a parameter which is proportional to a physically measurable function of an angle within the contact operating mechanism. By properly correlating these voltages, as will be shown more fully hereinafter, I provide an overlap regulator circuit which operates independently of the mechanically driven contacts.

In the case of a six coil connected rectifier in which each contact is provided with a single respective commutating reactor, as set forth in U.S. Patent No. 2,817,805 issued December 24, 1957, in the name of Diebold and entitled "Flux Reversal Circuit for Commutating Reactors of Mechanical Rectifiers" and assigned to the assignee of the instant invention, as contrasted to the three coil connected rectifier of the above noted patent to Diebold, the synthesizing circuit further includes a signal which is proportional to the D.-C. voltage. This is because in the six coil connected type of circuit, the contact is always closed at a predetermined point and regulation is achieved by electrically delaying the point at which the A.-C. load is connected to the D.-C. current, whereas in the three coil connection the delay is achieved mechanically by delaying the point at which the contacts close.

Accordingly, a primary object of my invention is to provide a novel overlap regulator circuit which imposes no additional duty on the mechanical rectifier contacts.

Another object of my invention is to provide a novel overlap regulator circuit for positioning the point at which the contacts break at a predetermined point within the step and does not use the rectifier contacts as a signal input means.

Another object of my invention is to provide a novel overlap regulator circuit which derives the desired position of contact break from electrical signals delivered independently of the contact.

Another object of my invention is to provide a novel overlap regulator circuit for rectifiers of either the three coil connected or six coil connected type where the circuit includes a constant voltage, a voltage proportional to the load current, a voltage proportional to the input voltage, and a voltage which is functionally related to a physically measurable angle within the contact positioning mechanism.

These and other objects of my invention will become apparent from the following description when taken in connection with the drawings, in which:

Figure 2 illustrates the contact operating mechanism for the system of Figure 1, and further illustrates the computer linkage which interconnects the overlap regulator and current regulator to the contact system.

Figure 1:
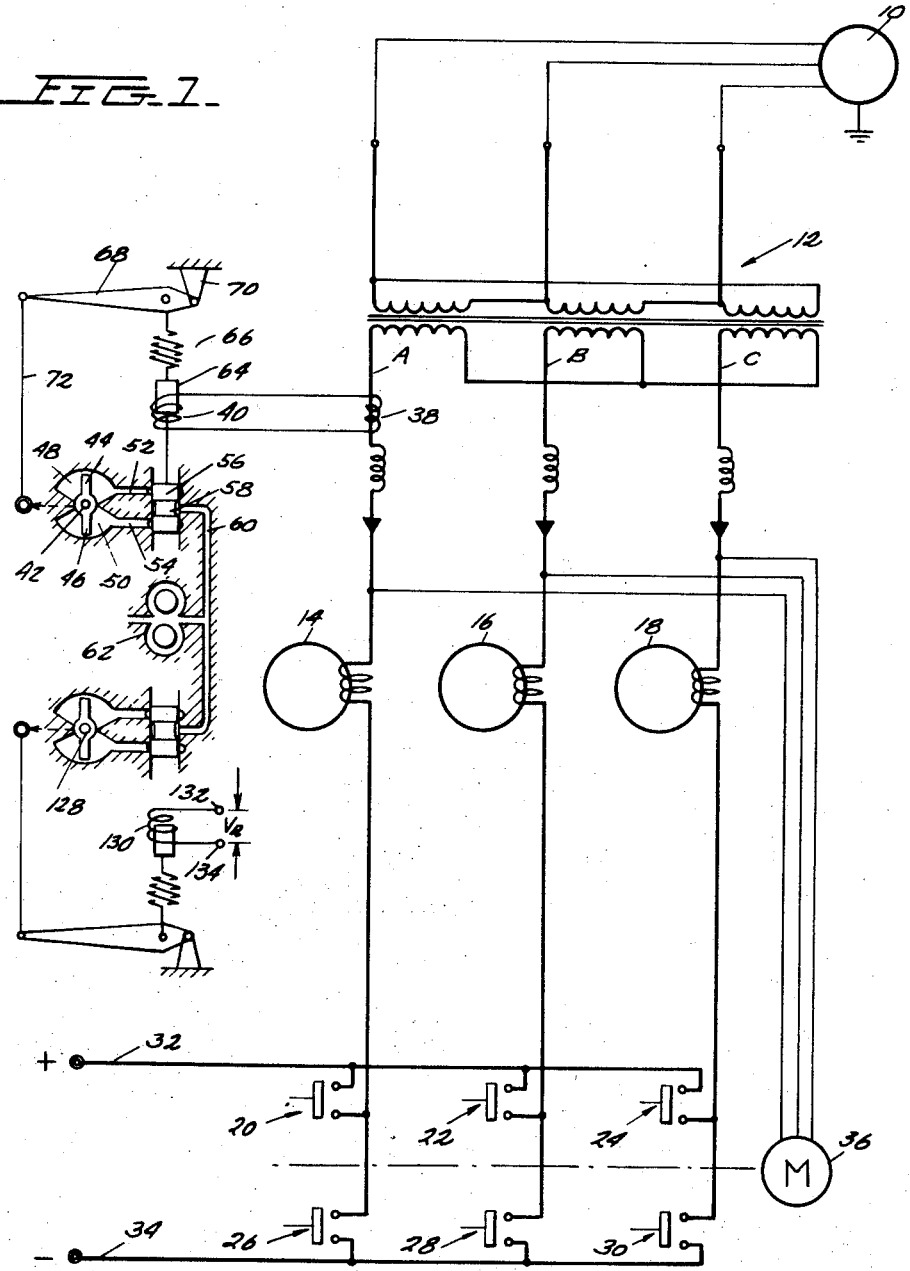
Figure 1 illustrates a three coil connected mechanical rectifier adapted with a hydraulic regulator of the type to which my invention may be applied.

Figure 3 schematically illustrates the current through two phases of the rectifier of Figure 1 during commutating conditions, as plotted against time.

Figure 4 is plotted on the same time base as Figure 3 and illustrates the commutating voltage when plotted against time.

Figure 5 illustrates a first embodiment of my novel regulator system for application to the regulator of the three coil connected rectifier of Figure 1.

Figure 6 illustrates the voltage conditions, as plotted against time for the case of a six coil connected rectifier.

Figure 7 shows a second embodiment of my novel invention for controlling the regulator of a six coil connected rectifier.

Referring now to Figure 1 which shows the three coil connected rectifier disclosed in U.S. Patent 2,759,141 to Diebold, A.-C. source 10 is connected to the primary winding of rectifier transformer 12. The secondary winding of transformer 12 is connected to three phases A, B and C which include commutating reactors 14, 16 and 18 respectively. Each of commutating reactors 14, 16 and 18 are then connected in series with a positive contact device 20, 22 and 24 respectively and a negative contact device 26, 28 and 30 respectively. By saying that contacts 20, 22 and 24 are positive, is meant that they connect their respective phase to a positive bus 32 when they are closed, while the negative contacts 26 through 30 connect their respective phase to a negative bus 34 when they are closed.

Commutating reactors 14, 16 and 18 are saturable type reactors having cores of highly rectangular hysteresis loop material. When any contact is closed, only the magnetizing current of its respective commutating reactor will flow until the reactor saturates. Hence a make step is provided.

Similarly, when the current through the closed contact decreases to zero, and attempts to reverse, the commutating reactor will unsaturate and provide a break step within which the contact may be disengaged.

The contacts 20 through 30 are driven by a synchronous motor 36, as schematically indicated by the dotted line and as will be set forth more fully hereinafter in connection with Figure 2, the synchronous motor 36 being energized from the secondary of transformer 12.

In order to regulate the output voltage in a three coil connected rectifier such as that shown in Figure 1, the position at which the contacts are closed is adjusted with respect to the input voltage so that the A.-C. source will be connected to the D.-C. load earlier or later in time phase, thus delivering a higher or lower D.-C. voltage respectively.

Accordingly, if it is desired to maintain a constant output load current, the position at which the contacts are closed is adjusted in accordance with load variations so as to adjust the output voltage and thus maintain a constant current.

The position at which the contacts in the three coil connected rectifier are to be disengaged is controlled by the position at which the break step occurs, which is controlled, in turn, by the various electrical parameters of the circuit.

Thus, in addition to a current regulator (if a current regulator is required), a mechanical rectifier must have an overlap regulator for properly adjusting the length of time that the contacts remain closed so that they may be opened somewhere in the middle of the break step produced by the commutating reactor.

The current regulator for the circuit of Figure 1 is shown to include a current measuring means comprised of current transformer 38 which energizes current regulator input coil 40. Current transformer 38, in measuring the current through phase A, in effect measures the D.-C. output current of the system. Regulator core 40 is designed to have a predetermined voltage applied thereto for balanced conditions, and operates to drive an output shaft 42, the position of which will control the point at which contact closure will occur, as will be more fully described hereinafter.

Shaft 42 contains two extensions 44 and 46 which are disposed in two hydraulic chambers 48 and 50 respectively. Chambers 48 and 50 communicate with passages 52 and 54 respectively which are normally blocked by piston 56. Piston 56 has a reduced section 58 therein whereby an upward displacement of piston 56 allows passage 52 to communicate with passage 60 of oil pump 62 so that oil will flow into the right-hand portion of chamber 48 under relatively high pressure to thereby cause extension 44 to be rotated counterclockwise. If piston 56 is moved downwardly, passage 60 will communicate with passage 54 so as to exert a force on member 46 to rotate shaft 42 in a clockwise direction. When piston 56 is in its central position, the shaft will be retained in its angular position, this being the balanced point of the system. The balanced control position of piston 56 is normally maintained by a predetermined energization of coil 40 from current transformer 38 so that magnetic plunger 64, which is an extension of piston 56, and is positioned within coil 40, holds the piston 56 against the force of gravity.

If the output current of the rectifier decreases, then the voltage applied to coil 40 is decreased whereby plunger 64 and piston 56 attached thereto will drop downwardly. This will cause shaft 42 to rotate clockwise, thus advancing the point at which the contacts close so as to increase the output voltage and bring the load current back to its predetermined value. The opposite operation will follow in the event that the load current energizing current transformer 38 is too high rather than too low.

In order to damp the operation of the regulator and prevent hunting, an anti-hunt spring 66 is connected to plunger 64 through the link 68 which is pivotally mounted at fixed support 70, and is connected to shaft 42 in any desired manner, as schematically indicated by the link 72.

The manner in which the closing position of contacts 20 through 30 is controlled by the current regulator is specifically set forth in Figure 2 which shows a schematic perspective view of the drive system for the contacts. Thus, in Figure 2, the three phases A, B and C coming from the transformer 12 of Figure 1 are each connected to one side of each of the contacts 20 through 30. The other side of the contacts are connected to D.-C. output conductors 32 and 34, as previously shown in Figure 1.

A pushrod mechanism which includes driving pushrods 74, 76, 78, 80, 82 and 84 are adapted, as shown in U.S. Patent No. 2,798,909, filed July 9, 1957, to Otto Jensen and assigned to the assignee of the instant invention, to drive the movable contact of each of their respective contacts 20 through 30 into and out of engagement with the stationary contacts. The pushrods 74 and 80 are attached to a first rocking member 86, pushrods 76 and 82 are attached to a second rocking member 88, and pushrods 78 and 84 are attached to a third rocking member 90. The upper end of the pushrods 74 to 84 are then movable into engagement with their respective cooperating contacts 20—30 respectively to drive them from a normally engaged position to a disengaged position. Rocking members 86, 88 and 90 are then pivoted on a common shaft 91 with the pushrods driven from their outward extremities, as shown in Figure 2.

In order to actuate rocking members 86, 88 and 90, they each contain downwardly extending members 91, 93 and 95 which may be pivotally supported at points 92, 94 and 96, and are rocked by means of eccentrics 98, 100 and 102 respectively which are positioned 120° out of phase with one another, and are driven from the rotor 104 of synchronous motor 36.

Thus, a rotary motion of rotor 104 will impart an oscillatory motion to rocking members 86, 88 and 90 which, in turn, will drive contacts 20 through 30 into and out of engagement with their respective stationary contacts where contacts 20, 22 and 24 are operated 180° out of phase with contacts 26, 28 and 30 respectively.

The position at which any of contacts 20 through 30 are engaged with respect to the input voltage of phases A, B and C is, therefore, determined by the instantaneous angular position of rotor 104. This position can then be controlled by rotating the stator 106 of the motor which will advance or delay the point at which actual contact make is achieved.

Control of the position of stator 106 is achieved through link 108 which is, in turn, driven by link 110 at the output of the computer mechanism described in the above noted Patent No. 2,759,141.

In order to control the length of time that any of contacts 20 through 30 remain closed and thus control the overlap or contact break position, the complete contact carrying assembly may be raised or lowered so as to control the length of time that the pushrods engage the contacts. That is, the length of time that the pushrods maintain the normally closed contacts in a disengaged position is controlled by the height of shaft 91. Thus, the support shaft 91 of rocking members 86, 88 and 90 is carried by links 112 and 114 which are pivotally mounted at pivot 116, and may be raised or lowered by raising or lowering link 118.

Link 118 is supported by an eccentric mechanism 120 which includes shaft 122 whereby the angular position of shaft 122 will determine the precise positioning of link 118 and, therefore, the length of time that the contacts remain engaged. Link 122 is, in turn, positioned by links 124 and 126 which are connected to the output of the computer mechanism which also controls the position of stator 106 and, thus, the point of contact make.

The input of the computer mechanism of Figure 2 includes shaft 42 of the current regulator of Figure 1. The overlap regulator of Figure 1 is identical to the current regulator and includes the output shaft 128 (see Figure 2) which is constructed and positioned in a manner identical to that described for shaft 42 by the energizing coil 130 which is energized at terminals 132 and 134 from my novel overlap regulator circuit.

The purpose of the computer mechanism is to make automatic correction of the change in the position of the break point responsive to change in the position of the make point by means of raising or lowering the shaft 91 and vice-versa. That is, when a correction in overlap is made by shifting the break point, the make point is shifted as well. However, this will change the output voltage of the system and it may be required that the output voltage be maintained constant. Accordingly, the computer linkage will automatically drive the stator 106 to maintain a constant make point when there is a change in overlap. This operation is fully described in U.S. Patent No. 2,759,141 whereby the computer linkage which interconnects shafts 42 and 128 to shafts 110 and 126 is such that the contacts 20 through 30 are properly adjusted for both make position and overlap, as determined by the angular positions of shafts 42 and 128.

It is sufficient to understand for purposes of the present invention that shaft 42, which is positioned in accordance with the energization of current transformer 38 of Figure 1, will control the mechanism of Figure 2 so as to properly position the point of contact closure to maintain a constant current, while the position of shaft 128 will properly control the length of time that the contacts are to remain closed, in order to have the contact break occur at the proper time, as determined by the energization of coil 130.

In a three coil connected rectifier such as that set forth in Figure 1, during commutation the current conditions will be those set forth in Figure 3 where current A is the current flowing through contact 20, while the current B is the current flowing through contact 22. During this commutating period, which is initiated by the closure of contact 22, the commutating voltage of Figure 4 will first fall across commutating reactor 16 at a time corresponding to angle $\alpha_1$. The make step finishes at point $\alpha_2$ of Figure 4 which is the time at which the commutating reactor 16 saturates, and the electrical overlap begins. The electrical overlap period lasts for the period $u$, during which time the commutating voltage drives the current in contact 20 downwardly, and the current through contact 22 upwardly.

At the end of this electrical overlap period, the commutating reactor 14 unsaturates and enters its break step at angle $\alpha_3$ of Figure 4, and this break step normally will last until time $\alpha_5$. During the break step of $\alpha_3$ to $\alpha_5$, it is preferable to be able to open the contact at a central position, such as $\alpha_4$. The function of the overlap regulator is to so control the length of time that the contacts remain closed that under any condition where the interval $\alpha_3$ through $\alpha_5$ is changed in position and length, the point of break will similarly change so as to always remain within the center of the step.

From the above theory of Figures 3 and 4, and from the theory of the hydraulic regulator of Figure 1, it can be shown that if the following relation is maintained, the contact break will always occur in the middle of the break step.

$$m\left(\left(E_{don}(\tau_M+\tfrac{1}{2}\tau_B)+\frac{V_R}{m}\right)\right.$$

$$\left.+\frac{6}{\pi}X_cI_d-E_{do}(\cos\alpha_1-\cos(\alpha_1+U))\right)=V_R$$

That is to say, if the predetermined voltage applied to regulator coil 130, which is voltage $V_R$, is always determined from the above relation, then the position of contact break will occur in the middle of the step. If any one factor varies, then $V_R$ will vary to initiate operation of the overlap regulator to reposition the point of contact break until the predetermined voltage $V_R$ is re-established.

In the above equation, the following legend identifies each of the parameters used with reference to usual nomenclature recognized in the rectifier art and in conjunction with the nomenclature of Figures 3 and 4.

*Legend*

$\alpha_1$ Angle of make
$\alpha_4$ Angle of break
$\beta$ Motor angle=$\alpha_1$+½$U$
$E$ Secondary voltage
$E_d$ Rectifier D.C. voltage
$E_{do}$ Rectifier open-circuit voltage
$E_{don}$ Normal rectifier open-circuit voltage
$I_d$ Direct-current output
$K$ Cos $\alpha_1$—cos($\alpha_1+U$)
$L_c$ Total commutating inductance
$m$ Multiplier—less than one
$\tau_N$ Rated length of make-step in radians
$\tau_B$ Rated length of break-step in radians
$U$ Angle of mechanical overlap
$V_R$ Voltage drop across regulator coil at balance
$X_c$ Total commutating reactance=$2\pi f^L c$ An analysis of the above relation will show that the first portion, $$m\left(E_{don}(\tau_M+\tfrac{1}{2}\tau_B)+\frac{V_R}{m}\right)$$

is constant and may be synthesized by a constant voltage.
The second portion, $$m\frac{6}{\pi}X_cI_d$$

is proportional to load current and may be synthesized by an input voltage which is proportional to load current.
The third portion of the equation, $$mE_{do}(\cos\alpha_1-\cos(\alpha_1+U))$$

is proportional to secondary voltage multiplied by a parameter proportional to a physically measurable function of the make angle, and may also be synthesized by a signal which is proportional to the secondary voltage and multiplied by a factor determined from the physically measurable angle of make $\alpha_1$ and angle of mechanical overlap $U$. These angles may be inserted into the electrical circuit by means of a potentiometer, such as potentiometer 136 of Figure 2, which is driven from contact positioning linkage at a point which moves in accordance with the relation cos $\alpha_1$—cos ($\alpha_1+U$).

Thus, it is seen that the equation given above will lend itself to a synthesizing circuit of the type set forth in Figure 5.

Referring now to Figure 5, the regulator coil 130 of Figure 5 and its terminals 132 and 134 are seen as connected in electrical series with three voltage sources. The first voltage source delivers a voltage which is proportional to the load current and comprises a current transformer 150 which develops a voltage across the resistor 152, this voltage being impressed on the voltage transformer 154.

The secondary voltage of voltage transformer 154 is then rectified by rectifier 156 which is connected to potentiometer 158 at its D.-C. output side. The voltage of potentiometer 158 which is impressed in a circuit including regulator coil 130 is then adjusted to be proportional to the above quantity $$m\frac{6}{\pi}X_c I_d$$

and this voltage supplies that part of the voltage of the synthesizing circuit relating to load current.

The second voltage source in the circuit is a voltage source having a constant output and may be obtained from any desired constant output voltage system. By way of example, terminals 160 and 162 may be connected to any alternating voltage source which may be of variable magnitude. This variable voltage is applied through a current limiting inductor 164 to the primary winding 166 of a saturable type reactor 168. The secondary winding 170 of saturable reactor core 168 is then directly connected to the A.-C. terminals of rectifier 172, and the D.-C. output of rectifier 172 is impressed across potentiometer 174. This type of system will operate to generate a constant D.-C. output voltage in the manner set forth in copending application, Serial No. 524,778, filed July 27, 1955, in the name of Diebold and assigned to the assignee of the instant invention. The voltage of potentiometer 174 which is impressed in a circuit including coil 130 will be proportional to the constant quantity, $$m\left(E_{don}(\tau_M + \frac{1}{2}\tau_B) + \frac{V_R}{m}\right)$$

and thus forms the constant portion of the synthesizing circuit which imitates the relationship given above.

The third voltage source for the circuit of Figure 5 is derived from the rectifier secondary voltage E connected to transformer 176. The output of the transformer 176 is then connected to rectifier 178. The output terminals of rectifier 178 are then connected in series with current limiting resistors 180 and 182 and potentiometer 136 which has been previously described in Figure 2 is driven in accordance with the desired functional relation of angles $\alpha_1$ and U. It is to be noted that a variety of linkages are available to drive the potentiometer, as will be obvious to anyone skilled in the art, so a schematic representation is used herein.

Accordingly, the output voltage of potentiometer 136 which is impressed upon the circuit including coil 130 will depend upon two factors. The first is the input voltage E applied to potential transformer 176; and the second is the angular position of the movable arm of potentiometer 136. Hence, the output voltage of potentiometer 136 will be proportional to the quantity, $$mE_{do}(\cos \alpha_1 - \cos (\alpha_1 + U))$$

where the open circuit rectifier voltage $E_{do}$ is proportional to the secondary voltage E and output voltage of potentiometer 136 will be functionally related to both the secondary voltage multiplied by some function of the angle of make and mechanical overlap so as to synthesize that portion of the equation given above for these factors.

In the above identified synthesizing equation it is seen that the voltage $V_R$ to be impressed across coil 130 for a balanced condition, the factors proportional to the constant voltage and the load current are in the same algebraic direction, while the factor proportional to the secondary voltage is in an opposite direction. Accordingly, the voltage drop across rheostats 158 and 174 are in a direction to buck the voltage across rheostat 136.

In operation of the system utilizing the regulator of Figure 5, when the portion of the synthesizing equation supplied by the constant voltage is adjusted for contact break in the middle of the step, then if the contact break occurs at some point other than the middle of the step because of a change in the position of the step, the output voltage to the regulator coil 130 will change to initiate operation of the hydraulic regulator and alter the circuit parameters until the voltage $V_R$ is returned to its predetermined value and the break occurs at the predetermined point within the step.

While Figures 1 through 5 illustrate my novel invention in conjunction with a three coil connected rectifier where voltage regulation is achieved through control of the point at which the contact is closed, it will be obvious to those skilled in the art that my novel invention may be extended to a six coil connected rectifier.

Six coil connected rectifiers are well known in the art and are fully described in copending application, Serial No. 423,357, filed April 15, 1954, now Patent No. 2,860, 301, in the name of Diebold and entitled "Commutating Reactor Break Pre-Excitation for Mechanical Rectifiers" and assigned to the assignee of the instant invention.

In six coil connected rectifiers, the contacts are always closed under zero voltage conditions. Voltage regulation is then achieved by controlling the length of time that a make step exists after contact closure.

Thus, with the use of flux reversal circuits applied to the commutating reactors, the length of time that the commutating reactors remain unsaturated after contact closing will control the time that voltage from the A.-C. source is applied to the D.-C. load through the contact which is closed to thereby achieve voltage regulation.

Thus, as is shown in Figure 6, in the six coil connected rectifier, the contacts are always closed when the commutating voltage of the system is zero. The make step is then initiated and lasts until the commutating reactor saturates at $\alpha_2$ at which time electrical overlap begins. At the point $\alpha_3$, the commutating phase enters a break step which ends at $\alpha_5$. Between $\alpha_3$ and $\alpha_5$ and at point $\alpha_4$ it is desired to disengage the contacts, this point being centrally located within the break step.

Here it is seen that the mechanical overlap interval U begins at zero voltage, since the contacts close at that point and end at $\alpha_4$. Accordingly, the angle of make $\alpha_1$ is always zero.

Accordingly, the synthesizing equation for the case of a six coil connected rectifier may be shown to be $$m\left(\left(\frac{1}{2}\tau_B E_{don} + \frac{V_R}{m}\right) + \frac{3}{\pi}X_c I_d - E_d + E_{do} \cos U\right) = V_R$$

In this equation, as was the case for the three coil connected rectifier, there is a first factor proportional to a constant voltage, a second factor proportional to load current, a third factor proportional to the secondary voltage times a measurable angle and a fourth factor proportional to the D.-C. voltage.

This equation may then be easily synthesized by the circuit of Figure 7.

Referring now to Figure 7, the load current factor is seen to be taken from the same type of load current circuit as utilized in Figure 5 and comprises the circuit elements 150 through 158. In the case of Figure 7, however, the voltage drop impressed across potentiometer 158 is proportional to $$m\frac{3}{\pi}X_c I_d$$

In a similar manner, the constant portion of the equation is taken from a constant voltage-generating system including the same circuit elements 160 through 174 as were used in the circuit of Figure 5.

However, in the case of the six coil connected rectifier, the constant voltage generated across resistor 174 will be proportional to $$m\left(\frac{1}{2}\tau_B E_{don} + \frac{V_R}{m}\right)$$

as is required by the above synthesizing equation.

Since the synthesizing equation requires a further signal proportional to the D.-C. voltage, a voltage dividing system including resistors 184, 186 and potentiometer 188 is connected across the D.-C. buses 32 and 34 whereby the voltage generated across that part of potentiometer 188, which is within the regulator coil circuit, is proportional to the D.-C. voltage, as required by the synthesizing equation.

The final component required in the synthesizing circuit is the signal which is proportional to the secondary voltage times the cosine of the mechanical overlap angle U. This signal is derived, as was the case in Figure 5, from the voltage transformer 176 which is connected to the secondary voltage of the rectifier, rectifier 178, resistors 180 and 182 (where these resistors are now shown as potentiometers for more flexibility in adjustment of the system), and the potentiometer 136.

In the case of Figure 7, however, potentiometer 136 is so driven as to be proportional only to the mechanical overlap angle, since the make step angle $\alpha_1$ is always zero.

Because of the algebraic signs of the synthesizing equation, it is seen that each of the voltages are connected in series, with the exception of the signal on potentiometer 188 which is in a bucking direction.

Accordingly, the operation of the circuit of Figure 7 will be such that regulator coil 130 will have a signal imposed thereon to maintain the point of contact break at a predetermined point within the break step. When there is a change in an electrical parameter of the system, thus changing the position of the break step, the regulator coil 130 will drive the overlap regulator to maintain the break point within the low current break step.

Although I have described preferred embodiments of my novel invention, many variations and modifications will now be obvious to those skilled in the art, and I prefer therefore to be limited not by the specific disclosure herein but only by the appended claims.

I claim:

1. In a system for transmitting energy between an A.-C. system and a D.-C. system, said system including a pair of contacts connected between said A.-C. system and said D.-C. system, said pair of contacts being movable between an engaged position for connecting said A.-C. system to said D.-C. system and a disengaged position for disconnecting said A.-C. system and said D.-C. system, and operating means associated with said pair of cooperating contacts for moving said pair of contacts between said engaged and disengaged position in synchronism with the frequency to said A.-C. system; an overlap regulator system, said overlap regulator system being connected to said operating means to control the point at which said pair of contacts are disengaged; said overlap regulator system being energized from electrical signals proportional to a plurality of selected circuit parameters; said overlap regulator system operating independently of signal voltages associated with said pair of contacts.

2. In a system for transmitting energy between an A.-C. system and a D.-C. system, said system including a pair of contacts connected between said A.-C. system and said D.-C. system, said pair of contacts being movable between an engaged position for connecting said A.-C. system to said D.-C. system and a disengaged position for disconnecting said A.-C. system and said D.-C. system, and operating means associated with said pair of cooperating contacts for moving said pair of contacts between said engaged and disengaged position in synchronism with the frequency of said A.-C. system; an overlap regulator system, said overlap regulator system being connected to said operating means to control the point at which said pair of contacts are disengaged; said overlap regulator system being energized from an overlap control circuit; said overlap control circuit being comprised of a synthesizing circuit for electrically computing a required signal for said overlap regulator circuit to maintain the break position of said pair of contacts at a predetermined position; said overlap regulator system operating independently of signal voltages associated with said pair of contacts.

3. In a system for transmitting energy between an A.-C. system and a D.-C. system, said system including a pair of contacts connected between said A.-C. system and said D.-C. system, said pair of contacts being movable between an engaged position for connecting said A.-C. system to said D.-C. system and a disengaged position for disconnecting said A.-C. system and said D.-C. system, and operating means associated with said pair of cooperating contacts for moving said pair of contacts between said engaged and disengaged position in synchronism with the frequency of said A.-C. system; an overlap regulator system, said overlap regulator system being connected to said operating means to control the point at which said pair of contacts are disengaged; said overlap regulator system being energized from an overlap control circuit; said overlap control circuit being comprised of a synthesizing circuit for electrically computing a required signal for said overlap regulator circuit to maintain the break position of said pair of contacts at a predetermined position; said synthesizing circuit including a first voltage signal functionally related to the A.-C. voltage of said A.-C. system and the position at which said pair of contacts begin to conduct current, and a second voltage signal functionally related to the D.-C. current of said D.-C. system; said overlap regulator system operating independently of signal voltages associated with said pair of contacts.

4. In a system for transmitting energy between an A.-C. system and a D.-C. system, said system including a pair of contacts connected between said A.-C. system and said D.-C. system, said pair of contacts being movable between an engaged position for connecting said A.-C. system to said D.-C. system and a disengaged position for disconnecting said A.-C. system and said D.-C. system, a commutating reactor comprised of a reactor having a relatively square hysteresis loop for providing an interval of low current prior to the time that said A.-C. system is to be disengaged from said D.-C. system, and operating means associated with said pair of cooperating contacts for moving said pair of contacts between said engaged and disengaged position in synchronism with the frequency of said A.-C. system; an overlap regulator system, said overlap regulator system being connected to said operating means to control the point at which said pair of contacts are disengaged so that said pair of contacts are disengaged during said interval of low current provided by said commutating reactor; said overlap regulator system being energized from signals proportional to selected circuit parameters; said overlap regulator system operating independently of signal voltages associated with said pair of contacts.

5. In a system for transmitting energy between an A.-C. system and a D.-C. system, said system including a pair of contacts connected between said A.-C. system and said D.-C. system, said pair of contacts being movable between an engaged position for connecting said A.-C. system to said D.-C. system and a disengaged position for disconnecting said A.-C. system and said D.-C. system, a commutating reactor comprised of a reactor having a relatively square hysteresis loop for providing an interval of low current prior to the time that said A.-C. system is to be disengaged from said D.-C.

system, and operating means associated with said pair of cooperating contacts for moving said pair of contacts between said engaged and disengaged position in synchronism with the frequency of said A.-C. system; an overlap regulator system, said overlap regulator system being connected to said operating means to control the point at which said pair of contacts are disengaged so that said pair of contacts are disengaged during said interval of low current provided by said commutating reactor; said overlap regulator system being energized from an overlap control circuit; said overlap control circuit being comprised of a synthesizing circuit for electrically computing a required signal for said overlap regulator circuit to maintain the break position of said pair of contacts at a predetermined position; said overlap regulator system operating independently of signal voltages associated with said pair of contacts.

6. In a system for transmitting energy between an A.-C. system and a D.-C. system, said system including a pair of contacts connected between said A.-C. system and said D.-C. system, said pair of contacts being movable between an engaged position for connecting said A.-C. system to said D.-C. system and an disengaging position for disconnecting said A.-C. system and said D.-C. system, a commutating reactor comprised of a reactor having a relatively square hysteresis loop for providing an interval of low current prior to the time that said A.-C. system is to be disengaged from said D.-C. system, and operating means associated with said pair of cooperating contacts for moving said pair of contacts between said engaged and disengaged position in synchronism with the frequency of said A.-C. system; an overlap regulator system, said overlap regulator system being connected to said operating means to control the point at which said pair of contacts are disengaged so that said pair of contacts are disengaged during said interval of low current provided by said commutating reactor; said overlap regulator system being energized from an overlap control circuit; said overlap control circuit being comprised of a synthesizing circuit for electrically computing a required signal for said overlap regulator circuit to maintain the break position of said pair of contacts at a predetermined position; said synthesizing circuit including a first voltage signal functionally related to the A.-C. voltage of said A.-C. system and the position at which said pair of contacts begin to conduct current and a second voltage signal functionally related to the D.-C. current of said D.-C. system; said overlap regulator system operating independently of signal voltages associated with said pair of contacts.

7. An overlap regulator energizing circuit for a mechanical rectifier; said mechanical rectifier being constructed to energize a D.-C. load from a multiphase A.-C. source, said mechanical rectifier being comprised of a pair of contacts for each phase, operating means for each said pair of contacts for synchronously driving said contacts between a make and break condition for connecting and disconnecting said A.-C. source to said D.-C. load; each of said pair of cooperating contacts having a commutating reactor associated therewith for providing a low current make step and break step; the position of said low current break step being determined by electrical conditions within said A.-C. source and said D.-C. load; said overlap regulator being operable to control the point at which said pair of contacts are disengaged by said operating means; said energizing circuit being connected to said overlap regulator means to control the operation of said overlap regulator means; said energizing circuit being constructed to generate voltages proportional to selected circuit parameters which control the position of said break step; said generated voltages being connected to control said overlap regulator to position the break point of said pairs of contacts within said break step under any condition of said selected circuit parameters; said overlap regulator system operating independently of signal voltages associated with said pair of contacts.

8. An overlap regulator energizing circuit for a mechanical rectifier; said mechanical rectifier being constructed to energize a D.-C. load from a multiphase A.-C. source, said mechanical rectifier being comprised of a pair of contacts for each phase, operating means for each said pair of contacts for synchronously driving said contacts between a make and break condition for connecting and disconnecting said A.-C. source to said D.-C. load; each of said pair of cooperating contacts having a commutating reactor associated therewith for providing a low current make step and break step; the position of said low current break step being determined by electrical conditions within said A.-C. source and said D.-C. load; said overlap regulator being operable to control the point at which said pair of contacts are disengaged by said operating means; said energizing circuit being connected to said overlap regulator means to control the operation of said overlap regulator means; said energizing circuit being constructed to generate voltages proportional to selected circuit parameters which control the position of said break step; said generated voltages being connected to control said overlap regulator to position the break point of said pairs of contacts within said break step under any condition of said selected circuit parameters; said selected circuit parameters including a first voltage signal functionally related to the A.-C. voltage of said A.-C. source and the position at which said pair of contacts begin to conduct current and a second voltage signal functionally related to the D.-C. current of said D.-C. system; said overlap regulator system operating independently of signal voltages associated with said pair of contacts.

9. The structure of claim 7 wherein said mechanical rectifier is of the three coil connected type; said overlap regulator maintaining the break position of said contacts in the middle of said break step when a predetermined voltage is applied thereto and correcting the position of the break of said contacts when said predetermined voltage is varied to bring the voltage applied to said regulator back to said predetermined value.

10. The structure of claim 7 wherein said mechanical rectifier is of the six coil connected type; said overlap regulator maintaining the break position of said contacts in the middle of said break step when a predetermined voltage is applied thereto and correcting the position of the break of said contacts when said predetermined voltage is varied to bring the voltage applied to said regulator back to said predetermined value.

11. The structure of claim 9 wherein said predetermined voltage for said regulator is developed by said energizing circuit as an output thereof, said energizing circuit developing an output voltage of $$m\left(\left(E_{don}(\tau_M+\frac{1}{2}\tau_B)+\frac{V_R}{m}\right)+\frac{6}{\pi}X_c I_d - E_{do}(\cos \alpha_1 - \cos(\alpha_1+U))\right)=V_R$$

where $m$ is a constant less than one, $E_{don}$ is the normal rectifier open circuit voltage, $\tau_M$ is the rated length of the make step in radians, $\tau_B$ is the rated length of the break step in radians, $V_R$ is the voltage drop across the regulator, $X_c$ is the commutating reactance, $I_d$ is the direct current output of the rectifier, $E_{do}$ is the rectifier open circuit voltage, $\alpha_1$ is the angle of make, and $U$ is the angle of mechanical overlap.

12. The structure of claim 10 wherein said predetermined voltage for said regulator is developed by said energizing circuit as an output thereof, said energizing circuit developing an output voltage of $$m\left(\left(\frac{1}{2}\tau_B E_{don}+\frac{V_R}{m}\right)+\frac{3}{\pi}X_c I_d - E_d + E_{do} \cos U\right)=V_R$$

where $m$ is a constant less than one, $E_{don}$ is the normal rectifier open circuit voltage, $\tau_B$ is the rated length of the break step in radians, $V_R$ is the voltage drop across the regulator, $X_c$ is the commutating reactance, $I_d$ is the direct current output of the rectifier, $E_{do}$ is the rectifier open circuit voltage, $\alpha$, is the angle of make, and $U$ is the angle of mechanical overlap; and $E_d$ is the rectifier D.-C. voltage.

References Cited in the file of this patent

UNITED STATES PATENTS

| | | |
|---|---|---|
| 2,557,739 | Goldstein et al. | June 19, 1951 |
| 2,759,141 | Diebold | Aug. 14, 1956 |
| 2,769,951 | Kleinvogel | Nov. 6, 1956 |
| 2,782,359 | Koppelmann | Feb. 19, 1957 |